(No Model.)
E. T. STARR.
ARTIFICIAL TOOTH.
No. 276,920. Patented May 1, 1883.
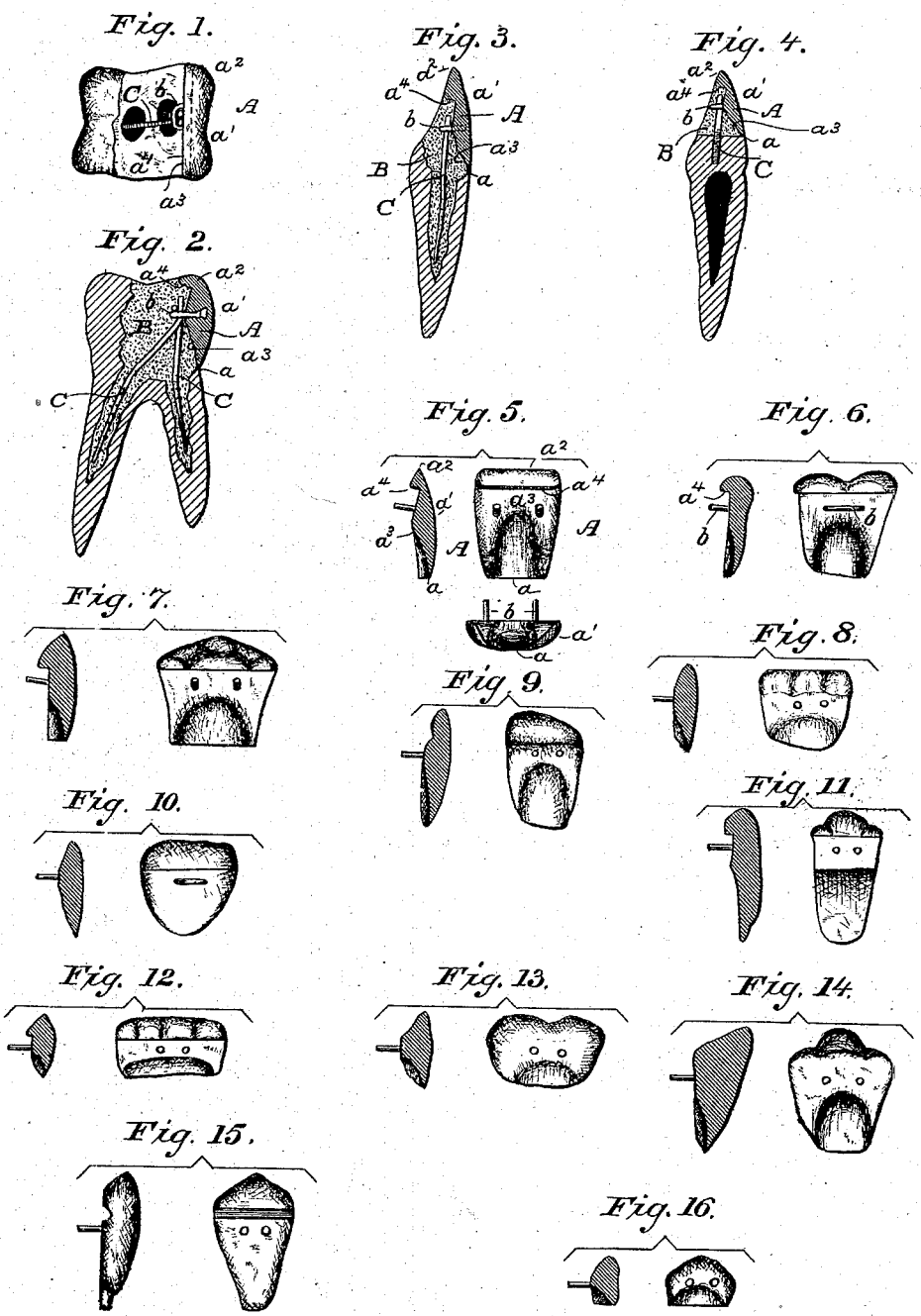
WITNESSES:
INVENTOR,
Eli T. Starr,
By his Attorneys

UNITED STATES PATENT OFFICE.

ELI T. STARR, OF PHILADELPHIA, PENNSYLVANIA.

ARTIFICIAL TOOTH.

SPECIFICATION forming part of Letters Patent No. 276,920, dated May 1, 1883.

Application filed July 28, 1882. (No model.)

*To all whom it may concern:*

Be it known that I, ELI T. STARR, of the city and county of Philadelphia, in the State of Pennsylvania, have invented certain new and useful Improvements in Facings or Veneers for Natural Teeth, of which the following is a specification.

My invention relates to facings or veneers for application to natural tooth-roots while in the mouth to supply the place of portions of tooth-crowns which may have been lost by decay or other cause, whereby a more durable, as well as unnoticeable, repair of a tooth may be effected.

Heretofore it has been the practice where the crown of a tooth was so far decayed as to prevent its being filled and preserved in the usual way, to remove the crown entirely from the root and pivot or secure on said root an artificial crown, made of porcelain, for instance, whereby the artificial crown takes the place and subserves the purposes to some extent of the natural crown. Various ways of pivoting tooth-crowns upon natural roots while in the mouth have heretofore been practiced, while many forms of such crowns and methods of applying them have been patented; but in most all of these cases objections exist either as to the unsightliness of the crown, its liability to fracture or breakage, or the uncertainty of obtaining good results. In another class of cases, also, where large cavities exist in the teeth exposed to view, but which permit of being filled and the natural crown saved, the practice has been to plug said cavities with a porcelain plug or stopper held in place in the tooth by means of some of the plastic fillings or cements, or by means of gold or other fillings rammed or packed into the cavity around the edges of the stopper.

My invention is designed more especially for practice in a class of cases which may be said to be intermediate between the two I have recited—that is, between the practice of pivoting by wholly removing the crowns, and of stopping cavities in the crowns with porcelain or other unnoticeable stoppers.

The object of my invention, therefore, more especially, is to provide a facing or veneer for application to natural teeth the crowns of which are too far decayed to permit of being durably and unnoticeably filled in the usual way, or by the use of porcelain plugs or stoppers, while there still remains a portion of the crown sufficiently strong to afford a firm support for a porcelain facing or veneer with an intermediate filling.

The subject-matter claimed is first fully described, and then particularly pointed out at the close of the specification.

In the accompanying drawings, Figure 1 is a plan or top view of a molar-tooth having a portion of its crown removed, and with one of my improved veneers or facings applied thereto by anchoring-pins extending into the root in readiness to receive a plastic or other filling which is to anchor or firmly secure the facing or veneer to the tooth. Fig. 2 is a vertical section through the tooth shown in Fig. 1, after the filling and repair of the tooth with my improved veneer has been completed. Figs. 3 and 4 show incisor-teeth having my improved facing or veneer applied thereto. Fig. 5 shows a sectional, a rear, and a plan view of one form of my improved facing or veneer. Figs. 6, 7, 8, 9, 10, 11, 12, 13, 14, and 16, respectively show rear and sectional views of other forms of my improved facing or veneer, and Fig. 15 shows an edge and an inner side or rear view of still another form of my improvements.

In applying my improved veneer or facing the decayed or injured portion of the crown is removed and an opening made into the nerve canal or canals of the tooth or enlargements thereof, or into the solid dentine of the root, for the reception of an anchoring post or posts, or a screw or screws, in well-known ways. My improved facing or veneer is then applied to the root so as to restore its natural contour, and is firmly secured thereto by means of a metallic loop projecting from the back of the veneer which envelops the anchoring post or posts, and by means of a filling, after the metallic connection with the anchoring-post is completed, applied, for instance, in the common way of applying the fillings for attaching the well-known Weston pivot-crown to a tooth-root.

My improved shell or veneer A (having reference to the drawings) is constructed preferably of porcelain, and in many different forms, so as to be applicable under many different circumstances, as follows: Its lower or neck end is brought to a fine or thin edge, $a$, so as to fit the root at its edge with a nice joint, as shown in Figs. 2, 3, and 4. Its outer surface or face, $a'$, is shaped to correspond in contour with the similar portion of the natural crown which has been lost or removed, and which is to be replaced by the veneer or facing, while its top or cutting or grinding edge, $a^2$, is also shaped to correspond with the similar part of a natural crown. The rear or inner face, $a^3$, of the shell or veneer, at or a little above its center, is provided with a loop, $b$, of metallic wire, while the lower part of the inner face, $a^3$, is concaved or recessed to form the fine or thin edge $a$ at the bottom, before alluded to. Above the loop-connection $b$, which is preferably made of platina and baked into the shells or veneers in the process of making them, the inner face of the veneers are provided with a transverse recess, under cut, shoulder, or groove, $a^4$, extending entirely across the veneer, the object of which is, when the veneer is applied to the tooth and the filling B placed in said groove, under cut, or recess to prevent food wedging in between the filling and veneer and forcing the latter off the root or displacing it.

In place of the loop $b$ at the back of the veneer to envelop the anchoring-post C, the veneers may in some cases be provided with two platina pins to be bent around the anchoring-post, as shown in Fig. 2, and afterward soldered together. In some cases the two pins to be bent around the anchoring pin or post after the veneer has been fitted to the tooth is preferable, while in other cases I prefer the loop-connection.

From what has been said it is believed the construction of my improved veneers or facings and their method of application will be fully understood.

I claim as my invention—

1. The veneer or facing for application to natural teeth in the mouth, having at its rear side, near its outer or cutting or grinding edge, a transverse groove, under cut, or recess extending entirely across the veneer from side to side, substantially as described.

2. A veneer or facing for application to natural teeth in the mouth, constructed with a thin edge at the bottom or neck to fit the tooth, a metallic connection at its rear side to be looped around an anchoring-post, and a transverse under cut, groove, or recess at said rear side above said loop-connection, extending entirely across the facing, for the purpose set forth.

In testimony whereof I have hereunto subscribed my name this 19th day of July, A. D. 1882.

ELI T. STARR.

Witnesses:
 WM. J. PEYTON,
 E. EUGENE STARR.